INVENTOR.
Leonard William Wolfe
BY
Slough and Canfield
ATTORNEYS

Patented Aug. 8, 1933

1,921,597

UNITED STATES PATENT OFFICE 1,921,597

WHEELED VEHICLE

Leonard William Wolfe, Liberty, Ind., assignor, by mesne assignments, to The Dunham Company, Berea, Ohio, a Corporation of Ohio Application January 24, 1931. Serial No. 510,947

8 Claims. (Cl. 280—80)

This invention relates to wheeled vehicles, particularly to the frame construction of vehicle bodies, and the running gear.

The invention hereinafter disclosed is applicable to numerous uses but I have chosen to show and describe it as applied to the construction of vehicles of the class commonly referred to as manure spreaders.

It is one of the objects of this invention to provide a frame construction for vehicles which will be simple and cheap to manufacture and strong and durable in use.

It is another object to provide a frame construction for vehicles which will embody the maximum of strength for the minimum of material.

Another object is to provide a frame construction for vehicles having improved means to facilitate the movement of the vehicle over rough ground without deforming or deteriorating the frame.

Another object is to provide, in a vehicle of the class employing radius rods from the vehicle body to a front axle construction, an improved means for attaching the radius rods to the axle and to the body.

Another object is to provide a frame construction for supporting and reinforcing a vehicle body and associated in an improved manner with a front axle construction of the non-pivoting or wheel-steering type.

Another object is to provide, in a vehicle frame construction of the type comprising generally a body portion and a front axle construction of the side-to-side rocking type, an improved means for connecting the body portion with the front axle construction.

Other objects will be apparent to those skilled in the art to which my invention appertains.

My invention is fully disclosed in the following description taken in connection with the accompanying drawings, in which.

Figure 1:
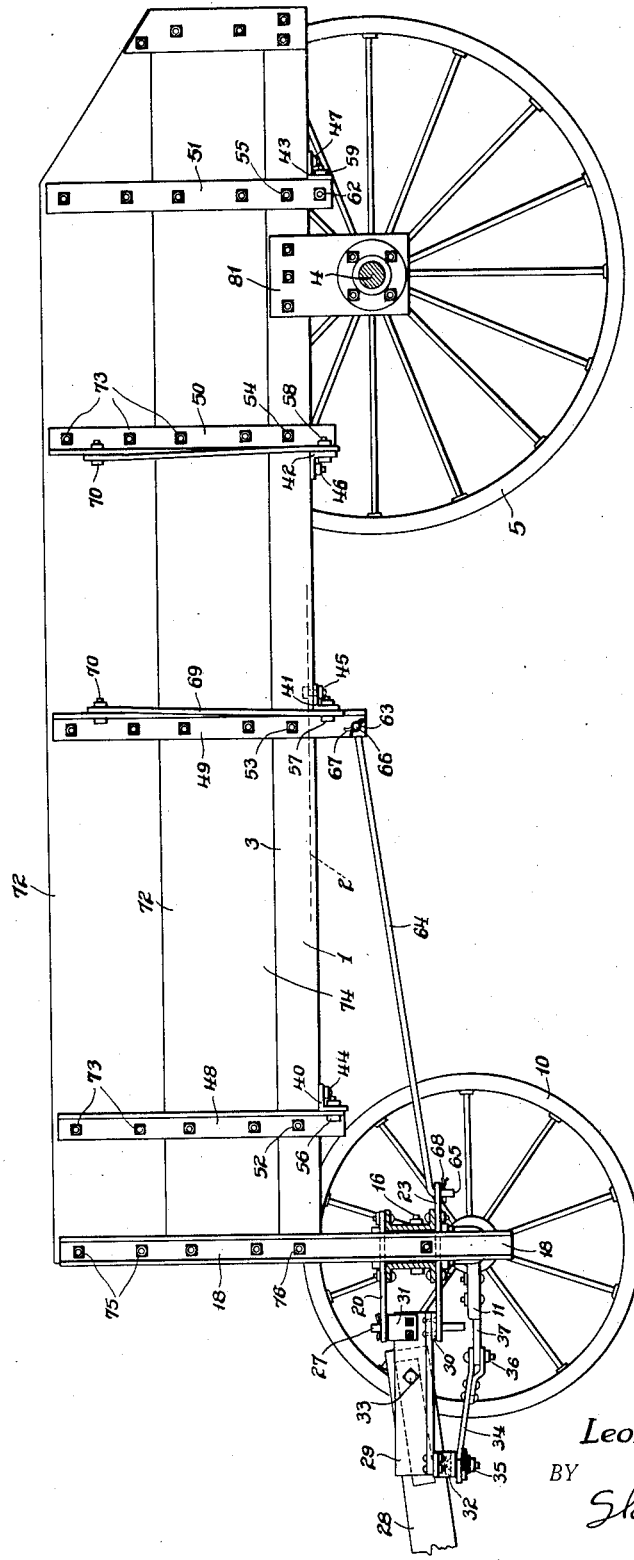
Fig. 1 is a side elevational view, partly in cross-section, and simplified for clearness, of a vehicle embodying my invention.
Figure 2:
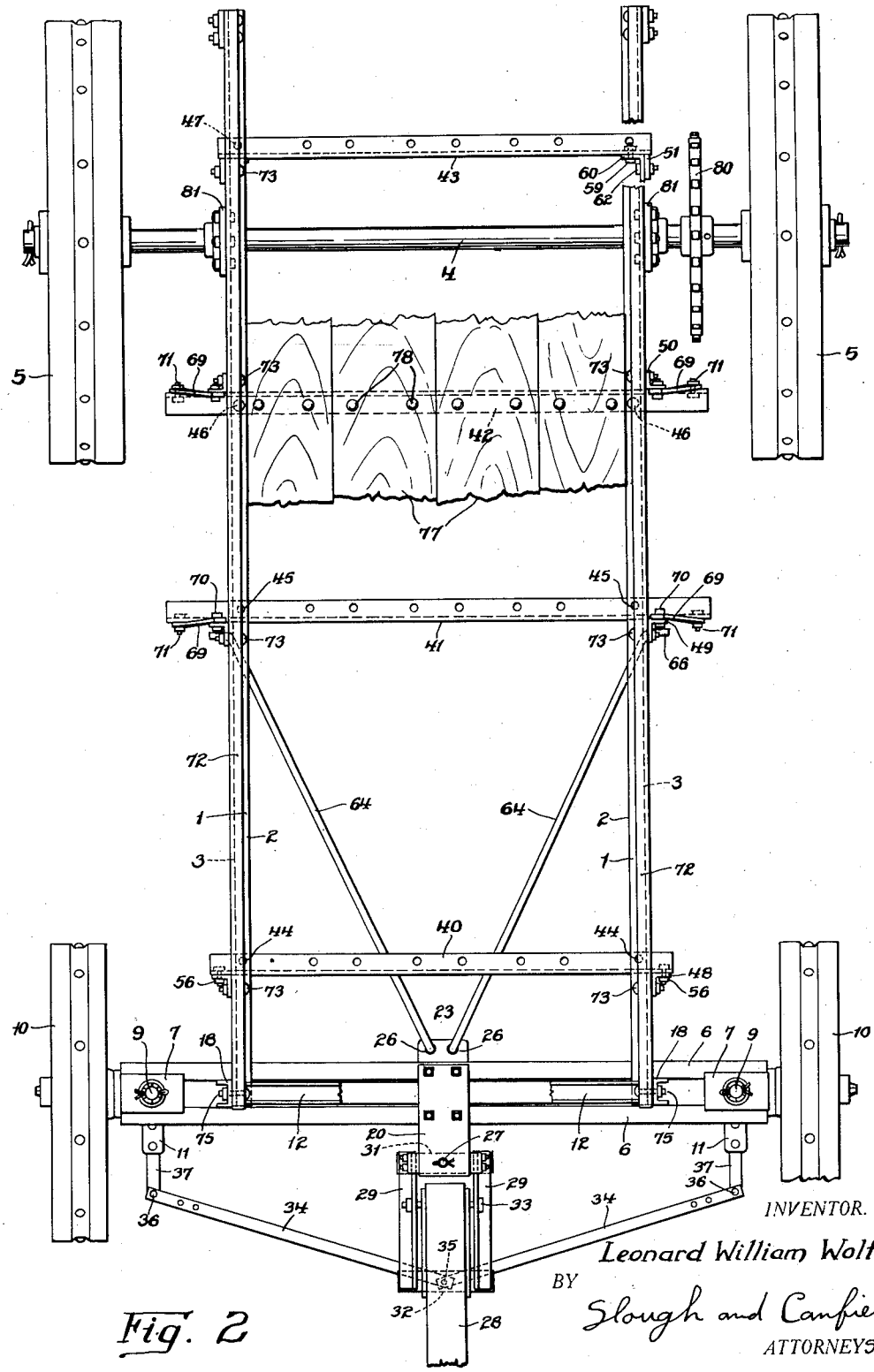
Fig. 2 is a top plan view of the vehicle of Fig. 1 with parts thereof broken away for the sake of clearness.

Referring to the drawings, I have shown at 1—1 a pair of longitudinally extending body sills, preferably formed from angle iron. The sills 1 are spaced apart as shown in Fig. 2 and define the bottom of the bed of the vehicle of which they form a part and are disposed with one leg of the angle 2 extending inwardly horizontally, and the other leg 3 extending vertically. Adjacent their rear ends, the sills 1 are supported upon a rear wheel axle 4 which in turn is supported by a pair of rear ground wheels 5—5. The structural means for supporting the sills 1—1 on the wheels 5—5 forms no essential part of my invention. In the drawings I have shown depending plates 81—81 riveted or bolted to the sills 1—1 and in their lower ends carrying the axle 4, upon which the wheels 5—5 are rotatably mounted. At their forward ends, the sills 1—1 are supported on a front axle construction which will now be described.

The front axle proper comprises a pair of transversely disposed spaced parallel channels 6—6 in the outer ends of which are bolted castings 7—7 supporting on vertical axes of rotation wheel heads 8—8 comprising vertical stub shafts 9—9 extending upwardly through the castings 7, laterally projecting stub shafts 82—82 upon which front wheels 10—10 are rotatably mounted, and forwardly projecting arms 11—11 by which the heads 8 may be rotated on their vertical axes to steer the wheels 10 in a manner to be described.

Figure 3:
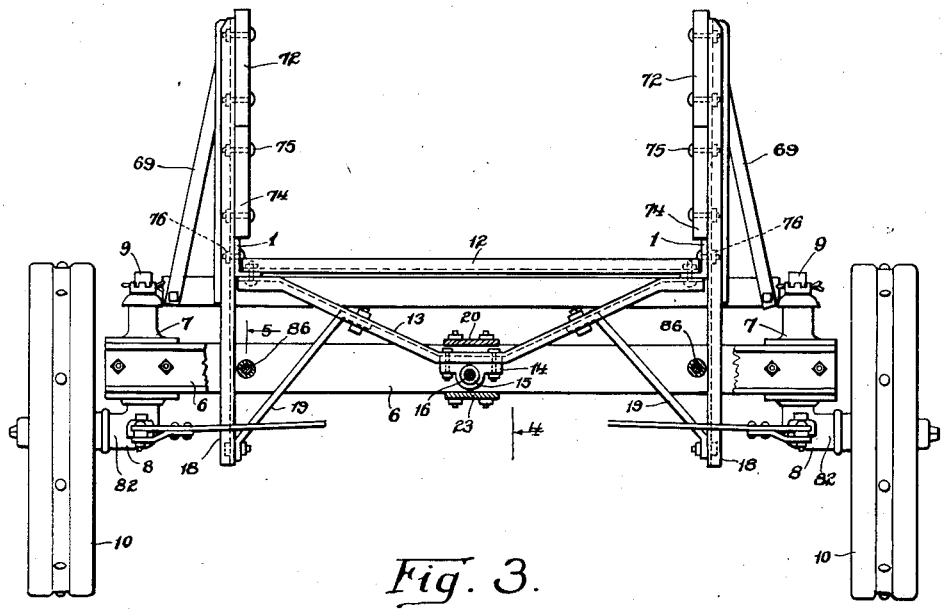
Fig. 3 is a front elevational view of the vehicle of Figs. 1 and 2, with parts broken away and parts in section for clearness.
Figure 4:
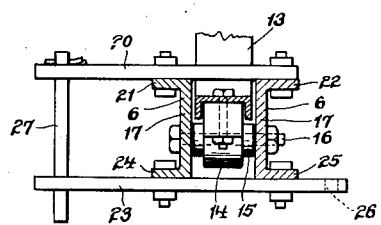
Fig. 4 is a fragmentary view to an enlarged scale taken from the plane 4 of Fig. 3.
Figure 5:
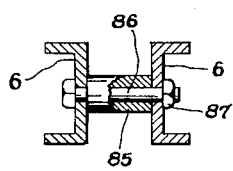
Fig. 5 is a sectional view taken from the plane 5 of Fig. 3.

A bar 12 preferably formed from channel iron is bolted or riveted at its ends, Fig. 3, to the horizontal legs 2—2 of the sills 1—1, resting thereupon and extending transversely from one sill to the other. Another piece of channel iron bent into the form of a truss, 13, generally of wide U-shape open upwardly, is bolted or riveted at the ends of the U-legs to the under sides of the horizontal flanges 2—2 of the angle iron sills substantially directly under the bar 12, and the closed end of the truss 13 extends downwardly between the channels 6—6 of the front axle. A rocker head 14, preferably a casting, is bolted to the truss 13 on a portion thereof between the channels 6—6. The head 14 is bored to receive a bushing 15, the axis of which is disposed substantially horizontally and midway between the sills 1—1, and a bolt 16 is projected through suitable perforations in the webs 17—17 of the channels 6—6 and through the bore of the bushing 15. Preferably the channels 6—6 are disposed with their webs 17—17 generally vertical and facing each other so that the ends of the bushing 15 may if desired abut against the webs 17—17, Fig. 4.

By the construction just described, the sills 1—1 and other parts of the forward end of the vehicle body to be more fully referred to and described, and any load that may be carried thereby, are supported at their forward ends by the bolt 16, the load being transferred thereto through the truss 13 and rocker head 14 and bushing 15; and the construction described also permits the front axle to rock around the axis of the bolt 16 when the wheels 10—10 encounter rough ground or obstacles on the ground in a well known manner.

To maintain the front axle disposed transversely of the sills 1—1, depending guides 18—18, preferably formed from channel iron, are secured to the forward ends of the sills 1—1 and to other portions of the body to be referred to, and extend below the sills 1—1 between the channels 6—6 of the front axle and are of such size as to substantially fill the space between the channels 6—6, Fig. 2. Braces 19 are secured to the legs of the truss 13 and to the guides 18 as shown in Fig. 3.

Substantially at the middle, transversely, of the axle channels 6—6, the channels have riveted or bolted thereto a top plate 20 seated upon the forwardly and rearwardly directed flanges 21 and 22 of the channels, and a bottom plate 23 secured to and seated upon the corresponding forwardly and rearwardly directed flanges 24 and 25 of the axle channels 6. The bottom plate 23 extends rearwardly of the front axle and is provided with a pair of spaced perforations 26—26 for a purpose to be described. Both of the plates 20 and 23 project forwardly from the axle channels 6—6 and in vertically aligned perforations support a king pin 27.

Mounted to swing on the vertical axis of the king pin 27 is a clevis construction for supporting the tongue 28 by which the vehicle may be propelled. The clevis construction comprises a pair of forwardly and rearwardly extending angle pieces 29—29 connected together at their rearward ends by a transverse piece 30 secured to horizontal flanges of the angle pieces 29 and by a transverse piece 31 vertically spaced from the piece 30 and secured to the vertical flanges of the angle pieces 29. The forward ends of the angle pieces 29 are connected together by a transverse piece 32 connected to the horizontal flanges of the angle pieces 29. The tongue 28 is pivoted on a horizontal transverse bolt 33 projected through perforations in the vertical flanges of the angle pieces 29. Straps 34—34 are pivoted at one end to the transverse piece 32 as at 35 approximately at the middle thereof, and at their other ends are pivotally connected as at 36—36 to steel extensions 37—37 of the arms 11.

By this construction, the tongue 28 may have vertical oscillatory movement around the bolt 33, and upon movement of the tongue 28 laterally, the angle pieces 29—29 will move with it, oscillating around the king pin 27, and this movement will be transmitted through the straps 34—34 to oscillate the wheels 10—10 on their vertical stub axles 9—9 to effect steering of the vehicle in a manner well known in the art.

By means of the plates 20 and 23, a very rigid front axle construction is effected, the two channels 6—6 being braced by the plates, and the draft load applied to propel the vehicle is transmitted equally to the two channels of the axle construction and at substantially the middle thereof.

To further brace the sills 1—1 and to provide suitable supports for a bottom and for sides of the vehicle, transverse sills and vertical stanchion elements are provided as follows. Transverse sills 40, 41, 42 and 43, preferably formed from angle iron, are disposed below, transversely of and secured to the sills 1—1 as by bolts or rivets 44, 45, 46 and 47 respectively, one flange of the angle lying flat against the horizontal flange 2 of the sills, and the other flange of the angle depending vertically. Stanchion elements 48, 49, 50 and 51 extend upwardly from the sills 1—1, being bolted thereto by bolts 52, 53, 54 and 55, and the stanchion elements depend from the sills 1 sufficiently to overlap and be secured to the transverse sills 40 to 43 inclusive by bolts or rivets 56, 57, 58 and 59 respectively. The stanchion elements 48 to 51 may be formed from angle iron or may be formed from flat bars of iron or steel. Both forms are shown in the drawings, the stanchion elements 48 to 50 inclusive being formed from angle iron and the stanchion element 51 from a bar. In the case of the angle-form stanchion elements, the front leg of the angle lies flat against the outer surface of the vertical leg 3 of the sill 1 and is bolted or riveted thereto as above described, and the other leg of the angle projects outwardly laterally, and this leg is bolted to the downwardly extending leg of the transverse sill by the bolts 56, 57 or 58 above referred to. In the case of flat bar stanchion elements such as the element 51, it is preferably laid flat against the outer surface of the vertical leg 3 of the sill 1 and bolted thereto as by the bolt 55 and to tie it to the transverse sill 43, a small section of angle iron 60, Fig. 2, is placed with one leg extending forwardly and rearwardly, and the other leg transversely inwardly, and the two legs of the angle section 60 are bolted as at 59 and 62, respectively, to the vertical leg of the transverse sill 43 and to the stanchion element 51.

The stanchion elements 48 to 51 thus preferably depend from the sills 1—1 sufficiently to overlap and engage the transverse sills 44 to 47 inclusive, and the stanchion element 49 preferably depends farther than the other stanchion elements, and the forwardly and rearwardly extending leg of the angle is provided with a perforation 63. A pair of draft bars 64—64 preferably formed from round rod with the ends thereof bent transversely to the axis of the rod to form hooks on the ends thereof are secured at one end in the perforation 63 just described and at the other end in the perforations 26 hereinbefore described which are provided in the inner end of the plate 23 on the front axle. The hook portion on the forward end of the rod 64 is bent downwardly as at 65 and hook portion on the rearward end of the rod is bent outwardly laterally as at 66, and after these hook portions have been inserted respectively through the perforations 26 and 63, they may be retained therein by cotter-pins or the like 67 and 68 projected through suitable holes in the end of the hook portion. The draft bars 64 thus tie the front axle to the body or bed of the vehicle, preventing forward and rearward movement of the axle relative to the body of the vehicle and being disposed close together at their forward ends do not interfere with the side-to-side rocking movement of the axle.

The stanchion elements 48 etc. may be braced to prevent their being bent or displaced laterally by braces 69—69. Such braces are illustrated as associated with the stanchion elements 49 and 50 and may be associated with the other stanchion elements if desired. The braces 69 are preferably formed from flat bar steel stock bolted as at 70—70 to the laterally extending leg of the angle-form stanchion elements, and adjacent the upper end thereof and bolted at the other end of the brace 69 as at 71 to the downwardly extending flange of the transverse sill 41 or 42, as the case may be, and the sills are extended outwardly laterally beyond the main sills 1—1 sufficiently to form a suitable triangle composed of the stanchion elements, the end of the transverse sill and the brace 69 whereby to effect a rigid bracing of the stanchion elements with the minimum of material.

The type of stanchion element 51 and its connection with the transverse sill 43 may be employed, as in the case of a manure spreader mechanism, where it is desired to have moving parts of the spreader mechanism disposed closely adjacent to the side of the vehicle body. In such cases, the laterally projecting leg of an angle bar and the laterally extending end of the transverse sill, provided in the cases of the stanchion elements 49 and 50, are omitted. The type of stanchion bar illustrated at 49 is employed when it is desired to provide both a brace 69 and an anchoring point for the draft bar 64. The type of stanchion element shown at 50 is employed when it is desired only to provide the brace 69, and the type of stanchion element shown at 48 is provided when it is not desired either to brace it as with a brace 69 or to provide an anchor for a radius rod.

The side proper of the vehicle body may be constructed from boards of wood 72—72 which may be bolted to the stanchion elements 48 to 51 inclusive as by bolts 73—73. The boards 72 may lie flat against the inside surface of the forwardly and rearwardly extending legs of the angles of the stanchion elements 48 to 50 and against the inner face of the stanchion element 51, and the lower board 74 may rest upon the upper edge of the vertical leg 3 of the sill 1.

While I have shown stanchions 48 to 51 inclusive disposed vertically, stanchions which slope or curve upwardly, that is, which extend generally upwardly may be employed if preferred.

The upwardly extending portions of the guides 18 may also be bolted to the boards 72 as at 75 and to the sills 1 as at 76 and thus perform some of the functions of a stanchion, as well as the functions of a guide as hereinbefore described. A bed or bottom proper of the vehicle may be provided by boards 77—77, Fig. 2, resting upon the horizontal flanges of the angle-form transverse sills 40 to 43 inclusive and bolted thereto as at 78—78.

The depending guides 18—18, besides performing the function of maintaining the front axle disposed transversely of the sills 1—1, that is, preventing the front axle from rotating around a vertical medial axis, may also perform the function of preventing the front axle from rotating around a horizontal transverse axis, as for example when the wheels encounter rough ground. However, the reaction of the guides 18—18 upon the channels 6—6 between which they lie, on occasions when the axle reacts to ground obstacles as mentioned, tends to pry the channels 6—6 apart. To resist this reaction and prevent spreading of the axle and channels 6—6, the channels are tied together and rigidly spaced apart by spacers 85—85 in the form of short sections of steel tubing or pipe placed between the webs of the channels, and a bolt 86 projected through the spacers 85 and through suitable perforations in the webs of the channels. When nuts 87 on the bolts are drawn up tight, the channels are clamped rigidly on the ends of the spacers 85. To have the maximum effectiveness, the spacers 85 are disposed closely adjacent to the guides 18—18 as shown in the drawings, Fig. 3, and the braces 19—19 are connected to the guides 18 adjacent the lower ends of the guides and spaced from the spacers 85 to permit rocking of the front axle without fouling of the braces 19 on the spacers 85. The spacers 85 are thus disposed in the triangle formed by the guides 18, truss 13 and brace 19.

The other parts of the vehicle, such as a forward end to the body and a driver's seat etc., and in the case of a manure spreader to which my invention is particularly applicable, the other parts not shown of the spreading mechanism may be of any known or suitable form and do not form an essential part of my invention, and for this reason, and to simplify the drawings, have been omitted. Such mechanism may be driven from the sprocket wheel 80 on the rear wheel axle 4, and any suitable clutch means between the ground wheel 5 and the sprocket wheel 80 may be provided.

I claim:

1. In a vehicle, a body, a front axle supporting the body, a rearwardly extending bracket secured to a middle portion of the axle, a pair of draft bars secured at their forward ends to the bracket and extending rearwardly and laterally therefrom, a pair of generally vertically disposed body reinforcing stanchion elements secured to the body and having portions projecting below the body, connected to the rearward ends of the draft bars.

2. In a vehicle, a body, a front axle supporting the body, a rearwardly extending bracket secured to a middle portion of the axle, a pair of adjacent perforations in the bracket, a pair of draft bars having hook portions on their forward ends projected through the perforations and extending rearwardly and laterally therefrom, the body comprising a longitudinal sill, a transverse sill secured thereto transversely thereof and a pair of generally vertical body reinforcing stanchion elements secured to the body and to both sills and having end portions projecting therebelow, and the other ends of the draft bars being secured to said portions of the stanchion elements.

3. In a vehicle, a body, a front axle supporting the body and comprising a pair of transverse axle channels disposed with their webs back to back and spaced apart, a plate having a forwardly extending portion secured to the upper flanges of the channels, a second plate having forwardly and rearwardly extending portions secured to the lower flanges of the channels, a vertically disposed pin on the forwardly extending portions of the plates, a vehicle tongue pivoted on the pin, a pair of adjacent perforations in the rearwardly extending portion of the lower plate, a pair of rearwardly divergent draft bars having hook portions in the perforations, the body comprising a pair of longitudinal sills, a transverse sill connected thereto, a pair of vertically disposed body reinforcing stanchion elements secured to the body and each connected at a lower end portion to both sills and projecting therebelow, the rearward ends of the draft bars being connected to the lower ends respectively of the stanchion elements.

4. In a vehicle, a front axle construction, a plate having a forwardly extending portion secured to the axle on an upper portion thereof, a second plate having a forwardly and rearwardly extending portion secured to a lower portion of the axle, a vertically disposed pin in the forwardly extending portions of both plates, a pair of adjacent perforations in the rearwardly extending portion of the lower plate, a pair of draft bars secured at their forward ends in the said perforations and diverging rearwardly therefrom.

5. In a vehicle, a body, a front axle comprising a pair of transverse axle channels disposed with their webs back to back and spaced apart, a truss element generally of U-shape depending from a forward portion of the body, and extending between the channels, a rocker head secured to the closed end of the U-shape truss element and provided with a forwardly and rearwardly extending bore, and a pin in the bore extending through perforations in the channel webs to support the body on the axle channels and to permit lateral rocking of the channels relative to the body.

6. In a vehicle, a front axle construction, a plate having a forwardly extending portion secured to the axle, a second plate having a forwardly and rearwardly extending portion secured to the axle, the two plates being spaced apart vertically, a generally vertically disposed pin in the forwardly extending portions of the plates, a pair of laterally spaced adjacent perforations in the second plate, and a pair of draft bars secured at their forward ends to the rearwardly extending portion of the corresponding plate by hook portions thereof in the perforations, and diverging rearwardly therefrom.

7. In a vehicle, a body, a front axle supporting the body and comprising a pair of transverse axle channels disposed with their webs back to back, a pair of spacer elements between the axle channels rigidly secured thereto, to predeterminedly space them apart a substantial distance, a pair of guide elements rigidly secured to the body and extending downwardly therefrom through the space between the axle channels, substantially filling the space therebetween and disposed adjacent to said spacer elements and guiding lateral rocking movement of the axle relative to the body and preventing relative oscillation of the axle on a vertical axis.

8. In a vehicle, a body, a front axle supporting the body and comprising a pair of transverse axle channels disposed with their webs back to back, a pair of spacer elements between the axle channels rigidly secured thereto, to predeterminedly space them apart a substantial distance, a pair of guide elements rigidly secured to the body and extending downwardly therefrom through the space between the axle channels, substantially filling the space therebetween and disposed adjacent to said spacer elements and guiding lateral rocking movement of the axle relative to the body and preventing relative oscillation of the axle on a vertical axis, a truss element generally U-shaped depending from a forward portion of the body and extending downwardly between the channels, and a pair of braces, each secured at one end to the truss element and at the other end to a portion of a guide element extending below the axle and under the said spacer elements.

LEONARD WILLIAM WOLFE.